US012639609B2

(12) United States Patent
Griffin et al.

(10) Patent No.: US 12,639,609 B2
(45) Date of Patent: May 26, 2026

(54) QUBIT REGISTRY NAMESPACES

(71) Applicant: Red Hat, Inc., Raleigh, NC (US)

(72) Inventors: Leigh Griffin, Waterford (IE); Stephen Coady, Dublin (IE)

(73) Assignee: Red Hat, LLC, Raleigh, NC (US)

( * ) Notice: Subject to any disclaimer, the term of this patent is extended or adjusted under 35 U.S.C. 154(b) by 205 days.

(21) Appl. No.: 18/541,003

(22) Filed: Dec. 15, 2023

(65) Prior Publication Data

US 2025/0200413 A1     Jun. 19, 2025

(51) Int. Cl.
*G06N 10/40* (2022.01)
*G06F 9/30* (2018.01)

(52) U.S. Cl.
CPC ......... *G06N 10/40* (2022.01); *G06F 9/30003* (2013.01)

(58) Field of Classification Search
None
See application file for complete search history.

(56) References Cited

U.S. PATENT DOCUMENTS

| | | | | |
|---|---|---|---|---|
| 12,231,416 B1 * | 2/2025 | Stapleton | ................ | H04L 63/08 |
| 2021/0334237 A1 * | 10/2021 | Coady | .................... | G06F 16/18 |
| 2021/0374583 A1 * | 12/2021 | Griffin | .................... | G06N 10/80 |
| 2022/0382605 A1 * | 12/2022 | Griffin | .................... | G06F 9/546 |
| 2022/0383171 A1 * | 12/2022 | Griffin | .................. | G06F 1/3203 |
| 2022/0404887 A1 * | 12/2022 | Cruise | .................... | G06F 1/3203 |
| 2023/0026029 A1 * | 1/2023 | Deen | .................... | H03K 17/102 |
| 2024/0037260 A1 * | 2/2024 | Griffin | .................. | G06N 10/40 |
| 2024/0177035 A1 * | 5/2024 | Griffin | .................. | G06N 10/20 |
| 2024/0405978 A1 * | 12/2024 | Griffin | .................. | H04L 9/0852 |
| 2025/0110796 A1 * | 4/2025 | Liu | ......................... | G06F 9/505 |
| 2025/0110938 A1 * | 4/2025 | Bose | .................... | G06F 16/2228 |

* cited by examiner

*Primary Examiner* — Philip Wang
(74) *Attorney, Agent, or Firm* — Dority & Manning, P.A.

(57) ABSTRACT

A quantum computing device obtains, from a first quantum instruction file (QIF) corresponding to a first quantum process, an amount of qubits required by the first quantum process. The quantum computing device creates a first namespace within a qubit registry comprising a plurality of qubit registry entries each corresponding to a qubit of a plurality of qubits, the first namespace referring to a first subset of qubits of the plurality of qubits, the first subset of qubits comprising at least the amount of qubits required by the first quantum process. The quantum computing device inserts an identifier for the first namespace into the first QIF. The quantum computing device causes the qubit registry to provide the first quantum process with access to the first namespace when the first QIF is executed.

20 Claims, 6 Drawing Sheets

QUBIT REGISTRY NAMESPACES

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently and accurately allocate qubits in real time will be desirable.

SUMMARY

The examples disclosed herein implement a qubit registry namespace manager that performs quantum resource management using qubit registry namespaces. In particular, the qubit registry namespace manager can create namespaces within a qubit registry. The qubit registry represents the qubit capabilities of a quantum computing system and can show the qubits that are available for use by a quantum process. Namespaces can subdivide a set of resources so that the subdivided set of resources can be available to a set of applications and unavailable to another set of applications. Qubit registry namespaces can be created to allow a quantum process associated with a qubit registry namespace to access a set of qubits that the qubit registry namespace refers to and to not access another set of qubits that are not referred to in the qubit registry namespace.

In one example, a method for quantum resource management using qubit registry namespaces is disclosed. The method includes obtaining, by a quantum computing device from a first quantum instruction file (QIF) corresponding to a first quantum process, an amount of qubits required by the first quantum process. The method further includes creating, by the quantum computing device, a first namespace within a qubit registry comprising a plurality of qubit registry entries each corresponding to a qubit of a plurality of qubits, the first namespace referring to a first subset of qubits of the plurality of qubits, the first subset of qubits comprising at least the amount of qubits required by the first quantum process. The method further includes inserting, by the quantum computing device, an identifier for the first namespace into the first QIF. The method further includes causing, by the quantum computing device, the qubit registry to provide the first quantum process with access to the first namespace when the first QIF is executed.

In another example, a quantum computing device for quantum resource management using qubit registry namespaces is disclosed. The quantum computing device comprises a system memory, and a processor device communicatively coupled to the system memory. The processor device is to obtain, from a first quantum instruction file (QIF) corresponding to a first quantum process, an amount of qubits required by the first quantum process. The processor device is further to create a first namespace within a qubit registry comprising a plurality of qubit registry entries each corresponding to a qubit of a plurality of qubits, the first namespace referring to a first subset of qubits of the plurality of qubits, the first subset of qubits comprising at least the amount of qubits required by the first quantum process. The processor device is further to insert an identifier for the first namespace into the first QIF. The processor device is further to cause the qubit registry to provide the first quantum process with access to the first namespace when the first QIF is executed.

In another example, a non-transitory computer-readable storage medium is disclosed. The non-transitory computer-readable storage medium stores thereon computer-executable instructions that, when executed, cause one or more processor devices to obtain, from a first quantum instruction file (QIF) corresponding to a first quantum process, an amount of qubits required by the first quantum process. The instructions further cause the processor device to create a first namespace within a qubit registry comprising a plurality of qubit registry entries each corresponding to a qubit of a plurality of qubits, the first namespace referring to a first subset of qubits of the plurality of qubits, the first subset of qubits comprising at least the amount of qubits required by the first quantum process. The instructions further cause the processor device to insert an identifier for the first namespace into the first QIF. The instructions further cause the processor device to cause the qubit registry to provide the first quantum process with access to the first namespace when the first QIF is executed.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
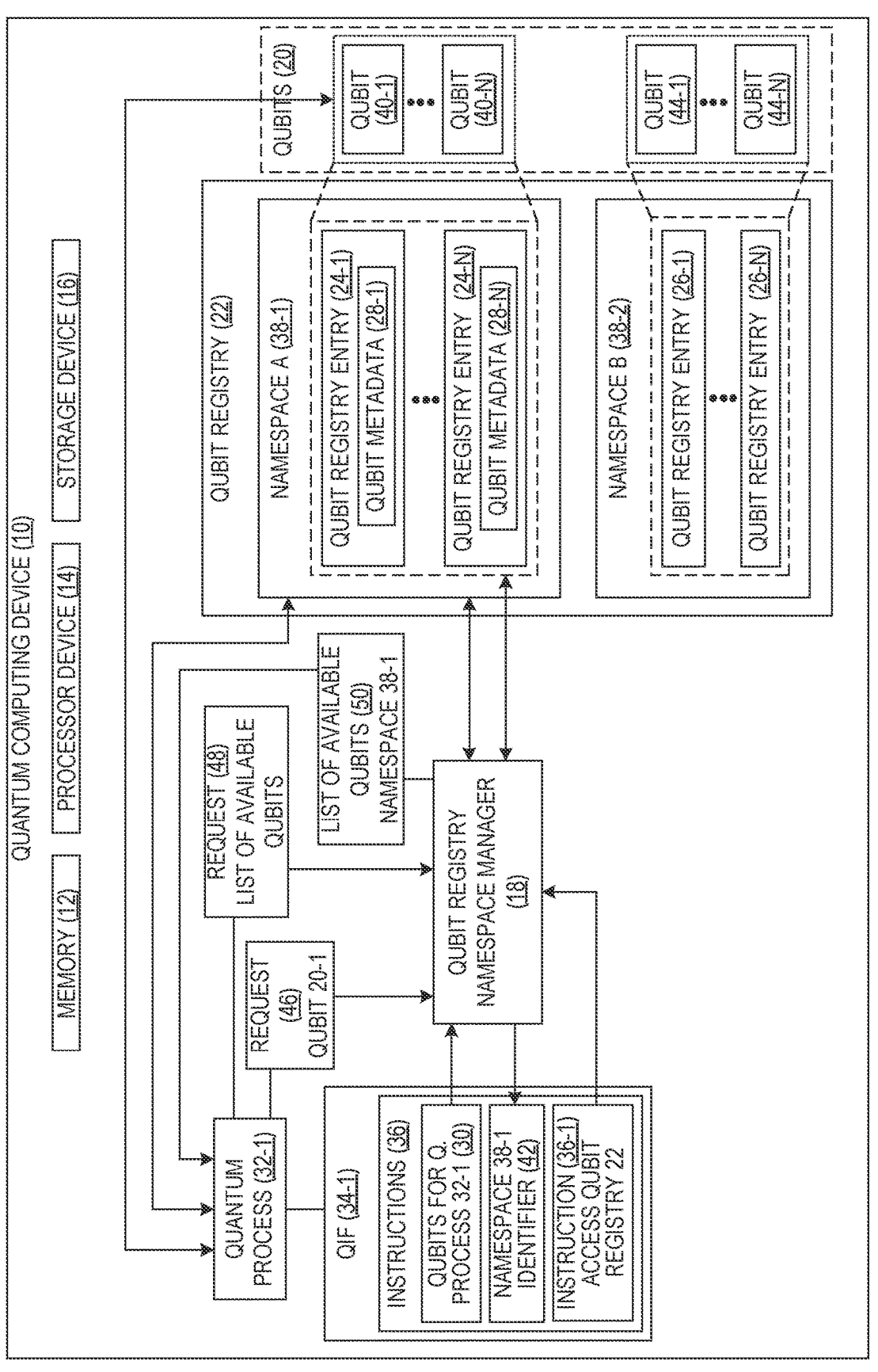
FIG. 1 is a block diagram of a quantum computing device in which examples of qubit registry namespaces may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first executing quantum service" and "second executing quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently and accurately allocate qubits in real time will be desirable.

A qubit registry in a quantum computing system can represent the qubit capabilities of the quantum computing system by showing the qubits that are available in the quantum computing system and providing an interrogatable means to infer the usage and ownership of the qubits. However, the visibility of the qubits through the qubit registry can present a security concern and may not be compliant with best practices regarding policy-based accesses of qubits. A mechanism to secure the visibility of qubits to particular quantum processes is therefore desired.

The examples disclosed herein implement a qubit registry namespace manager that performs quantum resource management using qubit registry namespaces. In particular, the qubit registry namespace manager can create namespaces within a qubit registry. The qubit registry represents the qubit capabilities of a quantum computing system and can show the qubits that are available for use by a quantum process. Namespaces can subdivide a set of resources so that the subdivided set of resources can be available to a set of applications and unavailable to another set of applications. Qubit registry namespaces can be created to allow a quantum process associated with a qubit registry namespace to access a set of qubits that the qubit registry namespace refers to and to not access another set of qubits that are not referred to in the qubit registry namespace. The qubit registry namespace manager thus allows the quantum computing system to provide segmented views and protect qubits, which may be in a finite number in the quantum computing system, from overuse.

Each qubit registry namespace can be associated with one or more quantum processes (e.g., quantum applications, quantum services) and when the quantum processes send a request to the qubit registry, the quantum processes can only see the qubits that are available for the namespace that is associated with the respective quantum process. As a result, controlled access to the qubits can be provided to ensure that the qubit registry can reserve the qubits that are required for the quantum processes and only provide access to the qubits via the namespaces. A useful application is for shared quantum processes that want to share and reuse qubits for chained executions without the risk of using an excess amount of qubits or impacting privacy.

In particular, the qubit registry namespace manager can use quantum instruction files (QIFs), which are used to execute quantum processes, to create the namespaces. The QIFs can be parsed to identify instructions that utilize qubits, and the qubit registry namespace manager can use those instructions to determine how many qubits a quantum process will need. A namespace can then be created in the qubit registry with the amount of qubits that the quantum process will need. Another namespace can be created for another quantum process with another QIF, so that there is one namespace for each quantum process with the amount of qubits that the quantum process will need and that is accessible only to that quantum process. An identifier for the namespace that was created for the quantum process can be added to the QIF for the quantum process so that when the quantum process is executing with the QIF, the qubits will only be accessed from the namespace.

FIG. 1 is a block diagram of a quantum computing device 10 that comprises a system memory 12, a processor device 14, and a storage device 16. It is to be understood that the quantum computing device 10 in some examples may include constituent elements in addition to those illustrated in FIG. 1. In the example of FIG. 1, the quantum computing device 10 implements a qubit registry namespace manager 18 that performs quantum resource management using qubit registry namespaces.

In the example of FIG. 1, the quantum computing device 10 implements a set of one or more qubits 20 for use by quantum services executed by the quantum computing device 10. To maintain information for the qubits 20, the quantum computing device 10 includes a qubit registry 22, which comprises a plurality of qubit registry entries 24 and 26 each corresponding to a qubit such as the one or more qubits 20. The qubit registry 22 maintains and provides access to data relating to the qubits implemented by the quantum computing device 10, such as a count of the total number of qubits implemented by the quantum computing device 10 and a count of the number of available qubits that are currently available for allocation, as non-limiting examples. Each of the qubit registry entries 24 and 26 of the qubit registry 22 also stores qubit metadata 28-1-28-N for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or a quantum phenomena indicator that indicates whether the corresponding qubit is in an entangled state and/or a superposition state.

The quantum computing device 10 of FIG. 1 executes one or more quantum services (not illustrated). Quantum services are processes that employ qubits such as the one or more qubits 20 to provide desired functionality. For example, quantum services can be quantum processes that employ the qubits 20. Execution of quantum services is facilitated by a quantum service manager (not illustrated) and a quantum service scheduler (not illustrated). The quantum service manager of the quantum computing device 10 handles operations for creating, monitoring, and terminating quantum services, while the quantum service scheduler of the quantum computing device 10 controls the scheduling of quantum services for execution by the processor device 14, and allocation of processing resources to executing quantum services. The functionality of the quantum service manager and the quantum service scheduler may be made accessible to other processes (e.g., via a defined application programming interface (API), as a non-limiting example).

The qubit registry namespace manager 18 may obtain an amount 30 of qubits that are required by a quantum process 32-1 of the quantum computing device 10. The quantum process 32-1 may be a quantum application or a quantum service, as non-limiting examples. The qubit registry namespace manager 18 can obtain the amount 30 of qubits that are required by the quantum process 32-1 from a quantum instruction file (QIF) 34-1 that corresponds to the quantum process 32-1. The QIF 34-1 may be a Quantum Assembly (QASM) file that includes a set of instructions 36 for executing the quantum process 32-1, such as instructions identifying qubits to access at a particular time or gates to apply to qubits, as non-limiting examples. In some implementations, the qubit registry namespace manager 18 can obtain the amount 30 of qubits that are required by the quantum process 32-1 by accessing the QIF 34-1, parsing the instructions 36 to generate parsed instructions for the qubit registry namespace manager 18 to identify instructions that use or manipulate qubits and determine how many qubits will be needed for the quantum process 32-1 when the QIF 34-1 executes, which can be quantified in the amount 30 of qubits that are required by the quantum process 32-1.

The qubit registry namespace manager 18 can create a namespace 38-1 within the qubit registry 22 that includes a subset of the qubit registry entries 24-1-24-N of the qubit registry entries in the qubit registry 22, thus the namespace 38-1 refers to a subset of qubits 40-1-40-N from the qubits 20 (collectively, subset of qubits 40) that correspond to the qubit registry entries 24-1-24-N. The subset of qubits 40 can include at least the amount 30 of qubits required by the quantum process 32-1. For example, there may be 100 qubits for the quantum computing device 10 (e.g., the qubits 20) and the amount 30 of qubits required by the quantum process 32-1 may be 25 qubits, so the qubit registry namespace manager 18 can create the namespace 38-1 with 25 qubits (e.g., the subset of qubits 40) that the quantum process 32-1 can view and access. The namespace 38-1 may be a first namespace of a plurality of namespaces within the qubit registry 22 (e.g., namespace 38-1 and namespace 38-2), each namespace including a subset of the qubit registry entries in the qubit registry 22 and referring to a subset of the qubits 20 that correspond to the subset of the qubit registry entries. In some examples, the quantum process 32-1 may be a user quantum application and the namespace 38-1 may be a user namespace. A user namespace can provide privileges and user identifications to the user that is associated with the user namespace, so the user associated with the user namespace 38-1 can access the user quantum application.

To create the namespace 38-1 within the qubit registry 22, the qubit registry namespace manager 18 may determine an amount of the qubits 20 that are already assigned to a namespace and an amount of the qubits 20 that are not assigned to a namespace. The qubit registry namespace manager 18 may then determine that the amount 30 of qubits required by the quantum process 32-1 is at least the amount of qubits that are not assigned to a namespace and assign qubits that are not assigned to a namespace to the namespace 38-1. The amount of qubits assigned to the namespace 38-1 can be at least the amount 30 of qubits required by the quantum process 32-1 and can be the subset of qubits 40. If there are not enough qubits 20 available for the namespace 38-1 based on the amount 30 of qubits required by the quantum process 32-1, the qubit registry namespace manager 18 may wait until qubits are available, send a warning or error, or find another namespace that has enough qubits available to share and/or is associated with a quantum process that can run in parallel with the quantum process 32-1.

The qubit registry namespace manager 18 can insert an identifier 42 for the namespace 38-1 into the QIF 34-1, which associates the namespace 38-1 with the quantum process 32-1. For instance, the identifier 42 may be a pointer to the namespace 38-1, such as a pointer to an address that identifies the namespace 38-1. Associating the namespace 38-1 with the quantum process 32-1 provides the quantum process 32-1 with access to the namespace 38-1, the qubit registry entries 24-1-24-N in the namespace 38-1, and the subset of qubits 40, and no access to other namespaces, qubit registry entries, and qubits (e.g., the namespace 38-2, the qubit registry entries 26-1-26-N, and the subset of qubits 44-1-44-N). The qubit metadata 28-1-28-N may also identify the namespace 38-1 and the quantum process 32-1 as being associated with the qubit registry entries 24-1-24-N and the subset of qubits 40 that are in the namespace 38-1, as well as the amount of qubits that are in the subset of qubits 40 (e.g., the amount 30 of qubits required by the quantum process 32-1). The qubit registry namespace manager 18 can cause the qubit registry 22 to provide the quantum process 32-1 with access to the namespace 38-1, and thus provide access to the qubit registry entries 24-1-24-N and the subset of qubits 40, when the QIF 34-1 is executed. When the qubit registry namespace manager 18 causes the qubit registry 22 to provide the quantum process 32-1 with access to the namespace 38-1, the qubit registry namespace manager 18 also causes the qubit registry 22 to provide the quantum process 32-1 with no access to the qubit registry entries 26-1-26-N and the subset of qubits 44-1-44-N of the qubits 20 that are not in the subset of qubits 40. Access for the quantum process 32-1 to the namespace 38-1 can include the qubit registry 22 being able to provide the quantum process 32-1 with information about the subset of qubits 40, such as the spin an entanglement of the subset of qubits 40, and allow the quantum process 32-1 to use the subset of qubits 40.

In some examples, the QIF 34-1 can be executed and once the QIF 34-1 starts executing, the qubit registry namespace manager 18 can determine, based on an instruction 36-1 of the instructions 36 of the QIF 34-1, that the quantum process 32-1 is accessing the qubit registry 22 to request one or more of the qubits 20. Since the quantum process 32-1 and the namespace 38-1 are associated, accessing the qubit registry 22 indicates that the namespace 38-1, the qubit registry entries 24-1-24-N, and the subset of qubits 40 are accessed. The association between the quantum process 32-1 and the namespace 38-1 can be recognized by the qubit registry namespace manager 18 via the identifier 42 in the QIF 34-1, as the qubit registry namespace manager 18 can identify the instruction 36-1 in the QIF 34-1 as accessing the qubit registry 22 and then identify the identifier 42 in the QIF 34-1 to know that the namespace 38-1 in the qubit registry 22 is the portion of the qubit registry 22 that can be accessed by the quantum process 32-1. The qubit registry namespace manager 18 can access the qubit registry entries 24-1-24-N of the namespace 38-1 and obtain for the quantum process 32-1 the one or more qubits that were requested from the subset of qubits 40 which the qubit registry entries 24-1-24-N refer to. In some implementations, prior to obtaining the one or more qubits from the subset of qubits 40, the qubit registry namespace manager 18 can determine that there are enough qubits available in the subset of qubits 40 to fulfill the request for the one or more qubits, such as by accessing the qubit metadata 28-1-28-N to determine which qubits of the subset of qubits 40 are available for use by the quantum process 32-1 and which qubits of the subset of qubits 40 are unavailable due to use by another quantum process with access to the namespace 38-1 or entanglement of the qubits as non-limiting examples.

In another example, the qubit registry namespace manager 18 may receive a request 46 from the quantum process 32-1 for one or more qubits of the qubits 20. The qubit registry namespace manager 18 can access the qubit registry 22 to request the one or more qubits by accessing the namespace 38-1 that is associated with the quantum process 32-1 and send the one or more qubits to the quantum process 32-1 from the subset of qubits 40. Since the quantum process 32-1 and the namespace 38-1 are associated, accessing the qubit registry 22 indicates that the namespace 38-1, the qubit registry entries 24-1-24-N, and the subset of qubits 40 are accessed, and the one or more qubits that are sent to the quantum process 32-1 are qubits that are in the subset of qubits 40. Thus, the qubit registry namespace manager 18 can access the qubit registry entries 24-1-24-N of the namespace 38-1 and send to the quantum process 32-1 the one or more qubits that were requested from the subset of qubits 40 which the qubit registry entries 24-1-24-N refer to. In some implementations, prior to sending the one or more qubits from the subset of qubits 40, the qubit registry namespace manager 18 can determine that there are enough qubits available in the subset of qubits 40 to fulfill the request for the one or more qubits, such as by accessing the qubit metadata 28-1-28-N to determine which qubits of the subset of qubits 40 are available for use by the quantum process 32-1 and which qubits of the subset of qubits 40 are unavailable due to use by another quantum process with access to the namespace 38-1 or entanglement of the qubits as non-limiting examples.

In another example, the qubit registry namespace manager 18 may receive a request 48 from the quantum process 32-1 for a list 50 of available qubits from the qubit registry 22 and send the list 50 of available qubits to the quantum process 32-1. The available qubits listed in the list 50 of available qubits are qubits that are associated with the namespace 38-1 (i.e., qubits in the subset of qubits 40) since the quantum process 32-1 is associated with the namespace 38-1 and the quantum process 32-1 requested the list 50 of available qubits. For instance, the qubit registry namespace manager 18 can determine, based on the qubit metadata 28-1-28-N of the qubit registry entries 24-1-24-N of the namespace 38-1, which qubits of the subset of qubits 40 are available for use by the quantum process 32-1, as well as which qubits of the subset of qubits 40 are unavailable due to use by another quantum process with access to the namespace 38-1 or entanglement of the qubits as non-limiting examples, and include the available qubits in the list 50. For example, the namespace 38-1 may refer to 25 qubits (e.g., the subset of qubits 40) and there may be 100 qubits for the quantum computing device 10 (e.g., the qubits 20), so the qubit registry namespace manager 18 may return the list 50 of available qubits that includes only the 25 qubits, not all 100 qubits, to the quantum process 32-1.

It is to be understood that, because the qubit registry namespace manager 18 is a component of the quantum computing device 10, functionality implemented by the qubit registry namespace manager 18 may be attributed to the quantum computing device 10 generally. Moreover, in examples where the qubit registry namespace manager 18 comprises software instructions that program the processor device 14 to carry out functionality discussed herein, functionality implemented by the qubit registry namespace manager 18 may be attributed herein to the processor device 14. It is to be further understood that while, for purposes of illustration only, the qubit registry namespace manager 18 is depicted as a single component, the functionality implemented by the qubit registry namespace manager 18 may be implemented in any number of components, and the examples discussed herein are not limited to any particular number of components.

Figure 2:
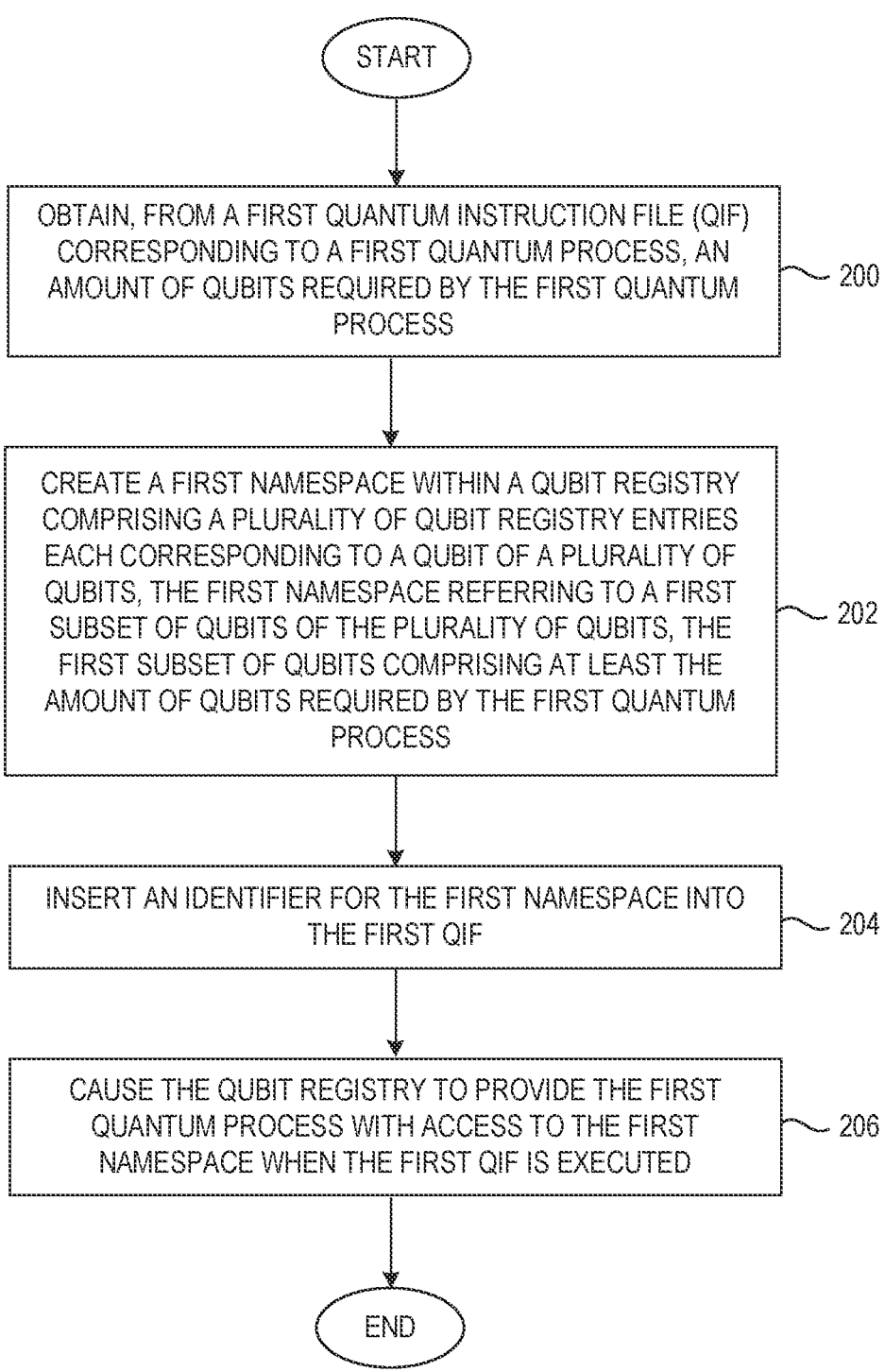
FIG. 2 is a flowchart illustrating operations performed by the quantum computing system of FIG. 1 for qubit registry namespaces, according to one example.

FIG. 2 is a flowchart illustrating operations performed by the quantum computing device of FIG. 1 for qubit registry namespaces, according to one example. Elements of FIG. 1 are referenced in describing FIG. 2 for the sake of clarity. In the example of FIG. 2, operations begin with a processor device of a quantum computing device, such as the processor device 14 of the quantum computing device 10 of FIG. 1, the processor device 14 to obtain, from a first quantum instruction file (QIF) corresponding to a first quantum process, an amount of qubits required by the first quantum process (block 200). The processor device 14 is then to create a first namespace within a qubit registry comprising a plurality of qubit registry entries each corresponding to a qubit of a plurality of qubits, the first namespace referring to a first subset of qubits of the plurality of qubits, the first subset of qubits comprising at least the amount of qubits required by the first quantum process (block 202). The processor device 14 is then to insert an identifier for the first namespace into the first QIF (block 204). The processor device 14 is then to cause the qubit registry to provide the first quantum process with access to the first namespace when the first QIF is executed (block 206).

Figure 3:
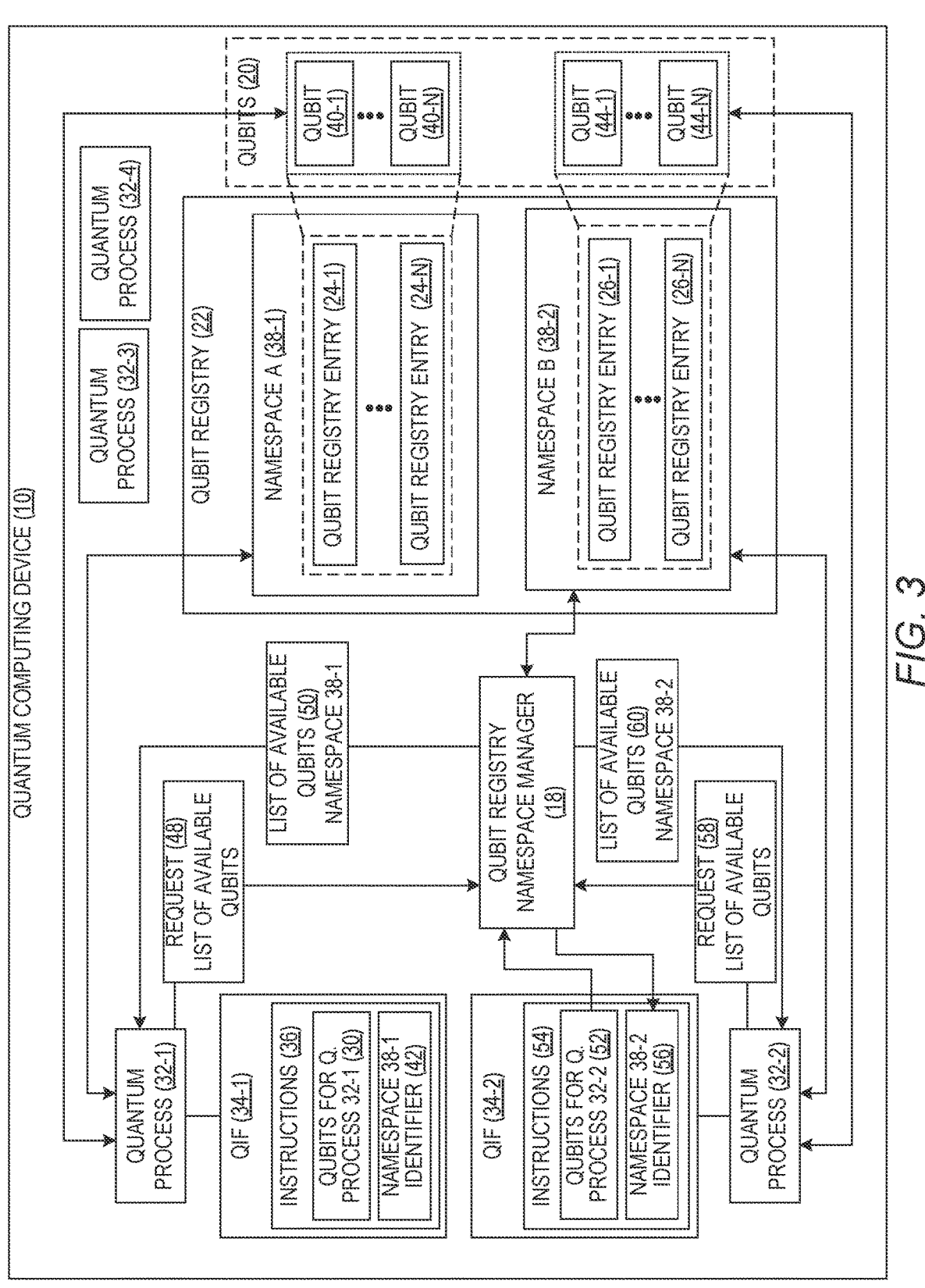
FIG. 3 is a block diagram of the quantum computing device of FIG. 1 for qubit registry namespaces, according to one example.

FIG. 3 is a block diagram of the quantum computing device of FIG. 1 for qubit registry namespaces, according to one example. Elements of FIG. 1 are referenced in describing FIG. 3 for the sake of clarity. In the example of FIG. 3, the qubit registry namespace manager 18 may obtain an amount 52 of qubits that are required by a quantum process 32-2 from a QIF 34-2 that corresponds to the quantum process 32-2. The quantum process 32-2 may be a second quantum process of a plurality of quantum processes of the quantum computing device 10, and the quantum process 32-2 may be a quantum application or a quantum service, as non-limiting examples. The QIF 34-2 may be a QASM file that includes a set of instructions 54 for executing the quantum process 32-2, such as instructions identifying qubits to access at a particular time or gates to apply to qubits, as non-limiting examples. In some implementations, the qubit registry namespace manager 18 can obtain the amount 52 of qubits that are required by the quantum process 32-2 by accessing the QIF 34-2, parsing the instructions 54 to generate parsed instructions for the qubit registry namespace manager 18 to identify which instructions use or manipulate qubits and determine how many qubits will be needed for the quantum process 32-2 when the QIF 34-2 executes, which can be quantified in the amount 52 of qubits that are required by the quantum process 32-2.

The qubit registry namespace manager 18 can create a namespace 38-2 within the qubit registry 22 that includes a subset of the qubit registry entries 26-1-26-N of the qubit registry entries in the qubit registry 22, thus the namespace 38-2 refers to a subset of qubits 44-1-44-N of the qubits 20 (collectively, subset of qubits 44) that correspond to the qubit registry entries 26-1-26-N. The subset of qubits 44 can include at least the amount 52 of qubits required by the quantum process 32-2. The namespace 38-2 may be a second namespace of a plurality of namespaces within the qubit registry 22 (e.g., namespace 38-1 and namespace 38-2), each namespace including a subset of the qubit registry entries in the qubit registry 22 and referring to a subset of the qubits 20 that correspond to the subset of the qubit registry entries.

The qubit registry namespace manager 18 can insert an identifier 56 for the namespace 38-2 into the QIF 34-2, which associates the namespace 38-2 with the quantum process 32-2. For instance, the identifier 56 may be a pointer to the namespace 38-2, such as a pointer to an address that identifies the namespace 38-2. Associating the namespace 38-2 with the quantum process 32-2 provides the quantum process 32-2 with access to the namespace 38-2, the qubit registry entries 26-1-26-N in the namespace 38-2, and the subset of qubits 44, and no access to other namespaces, qubit registry entries, and qubits (e.g., the namespace 38-1, the qubit registry entries 24-1-24-N, and the subset of qubits 40). The qubit registry namespace manager 18 can cause the qubit registry 22 to provide the quantum process 32-2 with access to the namespace 38-2, and thus provide access to the qubit registry entries 26-1-26-N and the subset of qubits 44, when the QIF 34-2 is executed.

When the qubit registry namespace manager 18 causes the qubit registry 22 to provide the quantum process 32-2 with access to the namespace 38-2, the qubit registry namespace manager 18 also causes the qubit registry 22 to provide the quantum process 32-2 with no access to the qubit registry entries 24-1-24-N and the subset of qubits 40 of the qubits 20 that are not in the subset of qubits 44. Access for the quantum process 32-2 to the namespace 38-2 can include the qubit registry 22 being able to provide the quantum process 32-2 with information about the subset of qubits 44, such as the spin an entanglement of the subset of qubits 44, and allow the quantum process 32-2 to use the subset of qubits 44. When the qubit registry namespace manager 18 causes the qubit registry 22 to provide the quantum process 32-2 with access to the namespace 38-2, the qubit registry namespace manager 18 also causes the qubit registry 22 to continue to provide the quantum process 32-1 with access to the namespace 38-1 and the subset of qubits 40 and to provide the quantum process 32-1 with no access to the namespace 38-2, the qubit registry entries 26-1-26-N, and the subset of qubits 44 of the qubits 20.

In some examples, the QIF 34-2 can be executed and once the QIF 34-2 starts executing, the qubit registry namespace manager 18 can determine, based on an instruction of the instructions 54 of the QIF 34-2, that the quantum process 32-2 is accessing the qubit registry 22 to request one or more of the qubits 20. Since the quantum process 32-2 and the namespace 38-2 are associated, accessing the qubit registry 22 indicates that the namespace 38-2, the qubit registry entries 26-1-26-N, and the subset of qubits 44 are accessed. The association between the quantum process 32-2 and the namespace 38-2 can be recognized by the qubit registry namespace manager 18 by the identifier 56 in the QIF 34-2, as the qubit registry namespace manager 18 can identify the instruction in the QIF 34-2 as accessing the qubit registry 22 and then identify the identifier 56 in the QIF 34-2 to know that the namespace 38-2 in the qubit registry 22 is the portion of the qubit registry 22 that can be accessed by the quantum process 32-2. The qubit registry namespace manager 18 can access the qubit registry entries 26-1-26-N of the namespace 38-2 and obtain for the quantum process 32-2 the one or more qubits that were requested from the subset of qubits 44 which the qubit registry entries 26-1-26-N refer to. In some implementations, prior to obtaining the one or more qubits from the subset of qubits 44, the qubit registry namespace manager 18 can determine that there are enough qubits available in the subset of qubits 44 to fulfill the request for the one or more qubits, such as by accessing the qubit metadata of the qubit registry entries 26-1-26-N to determine which qubits of the subset of qubits 44 are available for use by the quantum process 32-2 and which qubits of the subset of qubits 44 are unavailable due to use by another quantum process with access to the namespace 38-2 or entanglement of the qubits as non-limiting examples In another example, the qubit registry namespace manager 18 may receive the request 48 from the quantum process 32-1 for the list 50 of available qubits from the qubit registry 22 and send the list 50 of available qubits to the quantum process 32-1. The available qubits listed in the list 50 of available qubits are qubits that are associated with the namespace 38-1 (i.e., qubits in the subset of qubits 40) since the quantum process 32-1 is associated with the namespace 38-1 and the quantum process 32-1 requested the list 50 of available qubits. The qubit registry namespace manager 18 may also receive a request 58 from the quantum process 32-2 for a list 60 of available qubits from the qubit registry 22 and send the list 60 of available qubits to the quantum process 32-2. The available qubits listed in the list 60 of available qubits are qubits that are associated with the namespace 38-2 (i.e., qubits in the subset of qubits 44) since the quantum process 32-2 is associated with the namespace 38-2 and the quantum process 32-2 requested the list 60 of available qubits.

In another example, the quantum computing device 10 may include a plurality of quantum processes (e.g., quantum processes 32-1-32-4). For each of the quantum processes, the qubit registry namespace manager 18 may obtain an amount of qubits required by the quantum process from a QIF that corresponds to the quantum process, create a namespace within the qubit registry for the quantum process that refers to a set of qubits with at least the amount of qubits required by the quantum process, insert an identifier for the namespace into the QIF, and cause the qubit registry 22 to provide the quantum process with access to the namespace when the QIF is executed. Each quantum process of the plurality of quantum processes can thus be associated with a separate namespace that refers to separate qubits for the quantum processes to access. In another example with the plurality of quantum processes, the qubit registry namespace manager 18 may determine that more than one of the quantum processes can run in parallel or can wait for qubits and can allow the quantum processes to share a namespace by inserting an identifier for the namespace into the QIFs for the quantum processes and causing the qubit registry 22 to provide the quantum processes with access to the namespace.

Figure 4:
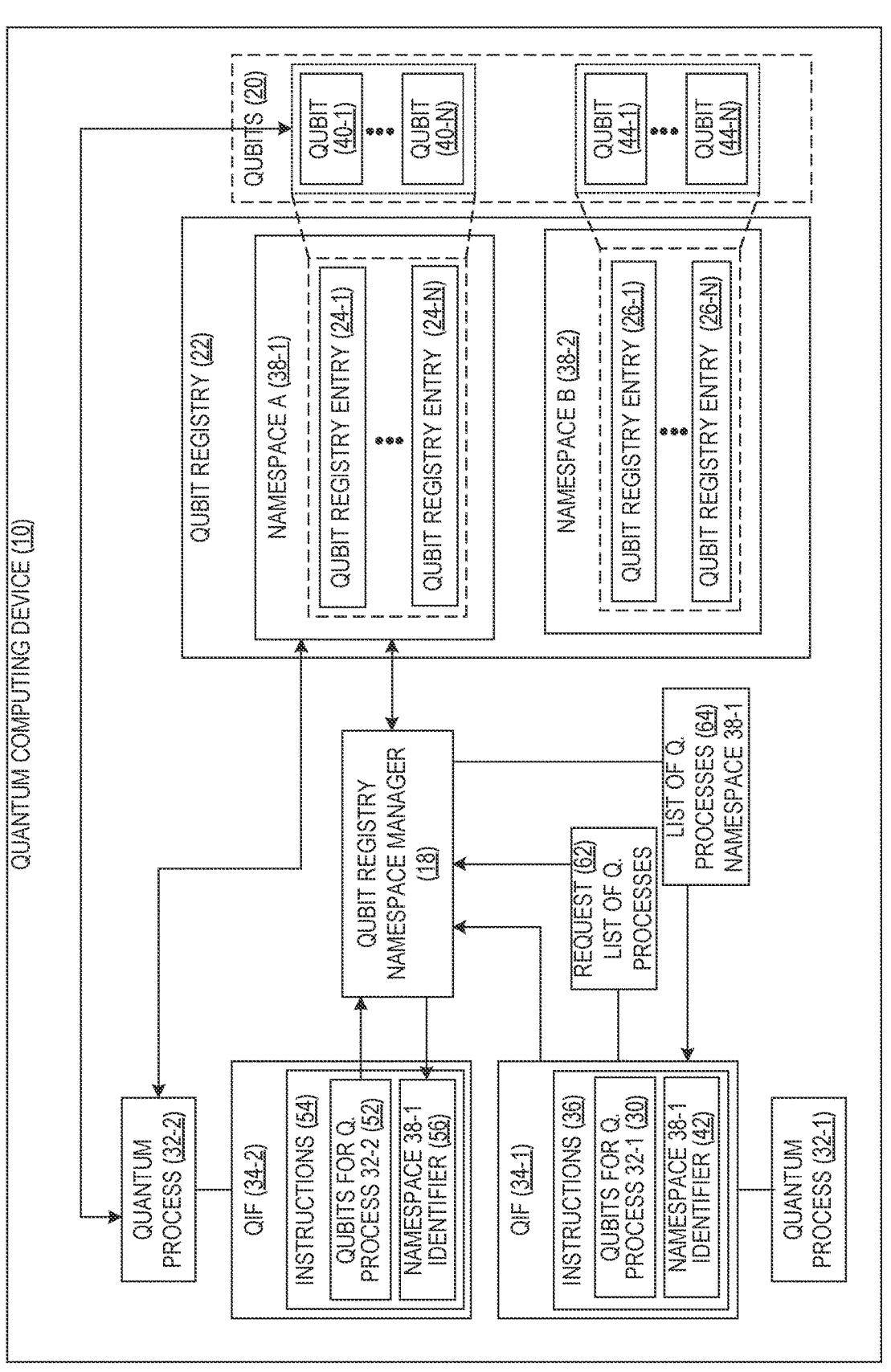
FIG. 4 is a block diagram of the quantum computing device of FIG. 1 for qubit registry namespaces, according to one example.

FIG. 4 is a block diagram of the quantum computing device of FIG. 1 for qubit registry namespaces, according to one example. Elements of FIG. 1 are referenced in describing FIG. 4 for the sake of clarity. In the example of FIG. 4, the qubit registry namespace manager 18 may obtain the amount 52 of qubits that are required by the quantum process 32-2 from the QIF 34-2 that corresponds to the quantum process 32-2. In some implementations, the qubit registry namespace manager 18 can obtain the amount 52 of qubits that are required by the quantum process 32-2 by accessing the QIF 34-2, parsing the instructions 54 to generate parsed instructions for the qubit registry namespace manager 18 to identify which instructions use or manipulate qubits and determine how many qubits will be needed for the quantum process 32-2 when the QIF 34-2 executes, which can be quantified in the amount 52 of qubits that are required by the quantum process 32-2.

The qubit registry namespace manager 18 can determine, based on the QIF 34-1 and the QIF 34-2, that the quantum process 32-1 and the quantum process 32-2 can run in parallel. In some examples, the qubit registry namespace manager 18 may determine, based on the QIF 34-1 and the QIF 34-2, that the quantum process 32-1 and the quantum process 32-2 can wait for qubits. Additionally or alternatively, the quantum process 32-1 and the quantum process 32-2 may be quantum processes that do not need exclusive access to qubits (e.g., the quantum processes do not entangle qubits or put qubits into superposition). Because the quantum process 32-1 and the quantum process 32-2 can run in parallel, wait for qubits, and/or do not need exclusive access to qubits, the quantum process 32-1 and the quantum process 32-2 can share the qubits in a namespace (e.g., the namespace 38-1). The qubit registry namespace manager 18 can insert the identifier 42 for the namespace 38-1 into the QIF 34-1 and the QIF 34-2, which associates the namespace 38-1 with the quantum process 32-1 and the quantum process 32-2. Associating the namespace 38-1 with the quantum process 32-1 and the quantum process 32-2 provides the quantum processes 32-1 and 32-2 with access to the namespace 38-1, the qubit registry entries 24-1-24-N in the namespace 38-1, and the subset of qubits 40, and no access to other namespaces, qubit registry entries, and qubits (e.g., the namespace 38-2, the qubit registry entries 26-1-26-N, and the subset of qubits 44). The qubit registry namespace manager 18 can cause the qubit registry 22 to provide the quantum process 32-1 and the quantum process 32-2 with access to the namespace 38-1, and thus provide access to the qubit registry entries 24-1-24-N and the subset of qubits 40, the when the QIF 34-1 and the QIF 34-2 are executed. Access for the quantum process 32-1 and the quantum process 32-2 to the namespace 38-1 can include the qubit registry 22 being able to provide the quantum processes 32-1 and 32-2 with information about the subset of qubits 40, such as the spin an entanglement of the subset of qubits 40, and allow the quantum processes 32-1 and 32-2 to use the subset of qubits 40.

In another example, the qubit registry namespace manager 18 may receive a request 62 from the quantum process 32-1 to view other quantum processes of the quantum computing device 10. The qubit registry namespace manager 18 can send to the quantum process 32-1 a list 64 of a set of quantum processes that each refer to the namespace 38-1. In the example of FIG. 3, the quantum process 32-1 and the quantum process 32-2 are associated with the namespace 38-1 and the quantum process 32-1 sent the request 62, so the list 64 of quantum processes can include the quantum process 32-1 and the quantum process 32-2. The list 64 would not include any quantum processes in another namespace in the qubit registry 22 (e.g., namespace 38-2) because the quantum process 32-1 sent the request 62 and the quantum process 32-1 is associated with the namespace 38-1, so the quantum process 32-1 has no visibility into the other namespaces. In another example, the qubit registry namespace manager 18 may receive a request from the quantum process 32-2 to view other quantum processes of the quantum computing device 10 and the qubit registry namespace manager 18 can send to the quantum process 32-2 a list of a set of quantum processes that each refer to the namespace 38-1 since the quantum process 32-2 is associated with the namespace 38-1.

Figure 5:
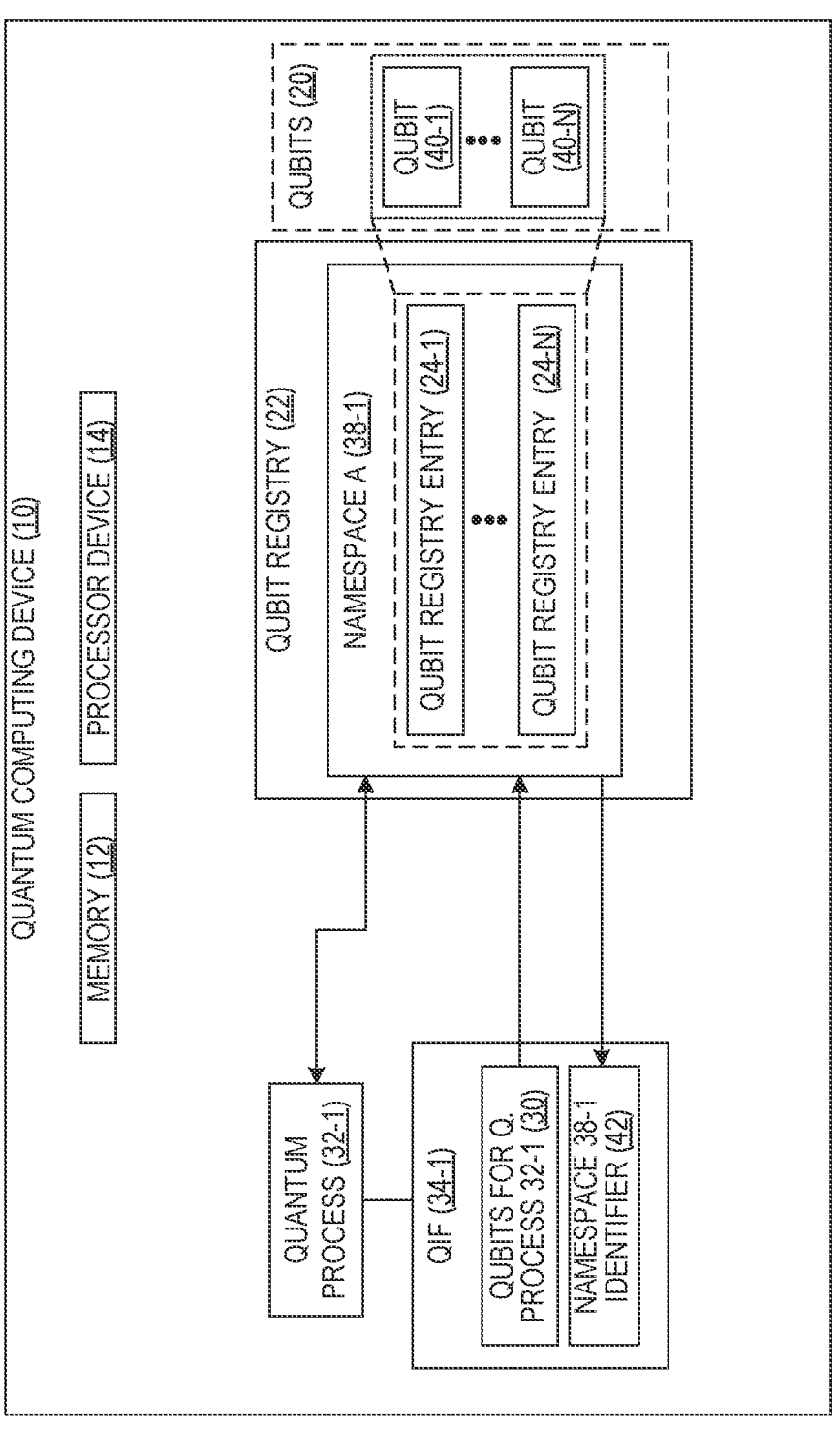
FIG. 5 is a block diagram of the quantum computing device of FIG. 1 for qubit registry namespaces, according to one example.

FIG. 5 is a block diagram of the quantum computing device 10 of FIG. 1 for qubit registry namespaces, according to one example. Elements of FIG. 1 are referenced in describing FIG. 5 for the sake of clarity. In the example of FIG. 5, a quantum computing device 10 comprises a system memory 12 and a processor device 14 coupled to the system memory 12. The processor device 14 is to obtain, from a first quantum instruction file (QIF) 34-1 corresponding to a first quantum process 32-1, an amount 30 of qubits required by the first quantum process 32-1. The processor device 14 is further to create a first namespace 38-1 within a qubit registry 22 comprising a plurality of qubit registry entries 24-1-24-N each corresponding to a qubit of a plurality of qubits 20, the first namespace 38-1 referring to a first subset of qubits 40 of the plurality of qubits 20, the first subset of qubits 40 comprising at least the amount 30 of qubits required by the first quantum process 32-1. The processor device 14 is further to insert an identifier 42 for the first namespace 38-1 into the first QIF 34-1. The processor device 14 is further to cause the qubit registry 22 to provide the first quantum process 32-1 with access to the first namespace 38-1 when the first QIF 34-1 is executed.

Figure 6:
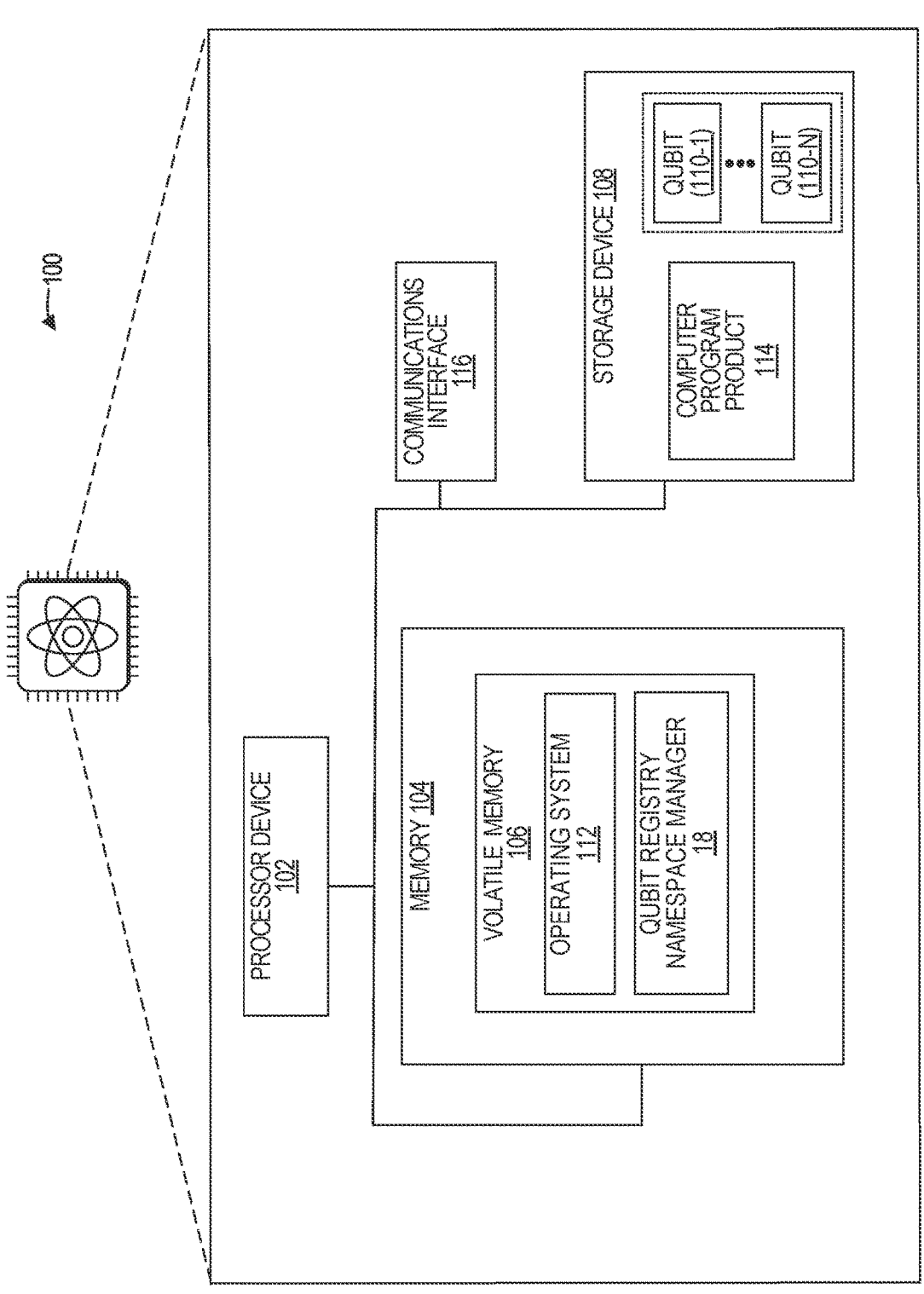
FIG. 6 is a block diagram of a quantum computing device suitable for implementing examples, according to one example.

FIG. 6 is a block diagram of a quantum computing device 100, such as the quantum computing device 10 of FIG. 1, suitable for implementing examples, according to one example. The quantum computing device 100 may comprise any suitable quantum computing device or devices. The quantum computing device 100 can operate using classical computing principles or quantum computing principles. Thus, in some implementations, portions of the quantum computing device 100 (e.g., the qubit registry namespace manager 18) may be executed using classical computing components and/or algorithms. When using quantum computing principles, the quantum computing device 100 performs computations that utilize quantum-mechanical phenomena, such as superposition and entanglement. The quantum computing device 100 may operate under certain environmental conditions, such as at or near zero degrees (0°) Kelvin. When using classical computing principles, the quantum computing device 100 utilizes binary digits that have a value of either zero (0) or one (1).

The quantum computing device 100 includes a processor device 102 and a system memory 104. The processor device 102 can be any commercially available or proprietary processor suitable for operating in a quantum environment. The system memory 104 may include volatile memory 106 (e.g., random-access memory (RAM)).

The quantum computing device 100 may further include or be coupled to a non-transitory computer-readable medium such as a storage device 108. The storage device 108 may comprise, for example, an internal or external hard disk drive (HDD) (e.g., enhanced integrated drive electronics (EIDE) or serial advanced technology attachment (SATA)) for storage, memory, or the like. The storage device 108 and other drives associated with computer-readable media and computer-usable media may provide non-volatile storage of data, data structures, computer-executable instructions, and the like. The storage device may also provide functionality for storing one or more qubits 110-1-110-N.

A number of modules can be stored in the storage device 108 and in the volatile memory 106, including an operating system 112 and one or more modules, such as the qubit registry namespace manager 18. All or a portion of the examples may be implemented as a computer program product 114 stored on a transitory or non-transitory computer-usable or computer-readable medium, such as the storage device 108, which includes complex programming instructions, such as complex computer-readable program code, to cause the processor device 102 to carry out the steps described herein. Thus, the computer-readable program code can comprise computer-executable instructions for implementing the functionality of the examples described herein when executed on the processor device 102.

An operator may also be able to enter one or more configuration commands through a keyboard (not illustrated), a pointing device such as a mouse (not illustrated), or a touch-sensitive surface such as a display device (not illustrated). The quantum computing device 100 may also include a communications interface 116 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:
obtaining, by a quantum computing device from a first quantum instruction file (QIF) corresponding to a first quantum process, an amount of qubits required by the first quantum process;
creating, by the quantum computing device, a first namespace within a qubit registry comprising a plurality of qubit registry entries each corresponding to a qubit of a plurality of qubits, the first namespace referring to a first subset of qubits of the plurality of qubits, the first subset of qubits comprising at least the amount of qubits required by the first quantum process;
inserting, by the quantum computing device, an identifier for the first namespace into the first QIF; and
causing, by the quantum computing device, the qubit registry to provide the first quantum process with access to the first namespace when the first QIF is executed.

2. The method of claim 1, wherein obtaining the amount of qubits required by the first quantum process comprises:
accessing the first QIF, wherein the first QIF comprises a plurality of instructions for executing the first quantum process;
parsing the plurality of instructions to generate a plurality of parsed instructions; and
identifying qubits needed for the first quantum process in the plurality of parsed instructions, wherein the amount of qubits comprises the qubits required by the first quantum process.

3. The method of claim 1, wherein creating the first namespace within the qubit registry comprises:
determining a first amount of qubits of the plurality of qubits that are assigned to a namespace;
determining a second amount of qubits of the plurality of qubits that are not assigned to a namespace;
determining that the amount of qubits required by the first quantum process is at least the second amount of qubits of the plurality of qubits that are not assigned to a namespace; and
assigning the second amount of qubits of the plurality of qubits to the first namespace.

4. The method of claim 1, further comprising:
in response to inserting the identifier for the first namespace into the first QIF, associating the first namespace with the first quantum process.

5. The method of claim 1, wherein causing the qubit registry to provide the first quantum process with access to the first namespace when the first QIF is executed comprises causing the qubit registry to provide the first quantum process with access to the first subset of qubits of the plurality of qubits and no access to qubits of the plurality of qubits that are not in the first subset of qubits.

6. The method of claim 1, further comprising:
starting an execution of the first QIF, wherein the first QIF comprises a plurality of instructions for executing the first quantum process;

determining, based on an instruction of the plurality of instructions, that the first quantum process is accessing the qubit registry to request one or more qubits of the plurality of qubits, wherein accessing the qubit registry comprises accessing the first namespace based on the identifier for the first namespace in the first QIF; and
obtaining the one or more qubits of the plurality of qubits for the first quantum process.

7. The method of claim 6, further comprising:
prior to obtaining the one or more qubits, determining that an amount of qubits equal to at least the one or more qubits are available in the first namespace.

8. The method of claim 1, further comprising:
receiving a request from the first quantum process for one or more qubits of the plurality of qubits;
accessing the qubit registry to request the one or more qubits, wherein accessing the qubit registry comprises accessing the first namespace; and
sending the one or more qubits to the first quantum process.

9. The method of claim 1, further comprising:
receiving, from the first quantum process, a request for a list of available qubits from the qubit registry; and
sending, to the first quantum process, the list of available qubits, wherein the available qubits are associated with the first namespace.

10. The method of claim 1, further comprising:
receiving, from the first quantum process, a request to view other quantum processes; and
sending, to the first quantum process, a list of a set of quantum processes of the other quantum processes, each quantum process of the set of quantum processes referring to the first namespace.

11. The method of claim 1, wherein the first quantum process comprises a user quantum application and the first namespace comprises a user namespace.

12. The method of claim 1, further comprising:
obtaining, from a second QIF corresponding to a second quantum process, an amount of qubits required by the second quantum process;
determining based on the first QIF and the second QIF that the first quantum process and the second quantum process can run in parallel;
inserting an identifier for the first namespace into the second QIF; and
causing the qubit registry to provide the second quantum process with access to the first namespace when the second QIF is executed.

13. The method of claim 1, further comprising:
obtaining, from a second QIF corresponding to a second quantum process, an amount of qubits required by the second quantum process;
creating a second namespace within the qubit registry, the second namespace referring to a second subset of qubits of the plurality of qubits, the second subset of qubits comprising at least the amount of qubits required by the second quantum process;
inserting an identifier for the second namespace into the second QIF; and
causing the qubit registry to provide the second quantum process with access to the second namespace when the second QIF is executed.

14. The method of claim 13, further comprising:
in response to inserting the identifier for the second namespace into the second QIF, associating the second namespace with the second quantum process.

15. The method of claim 13, wherein causing the qubit registry to provide the second quantum process with access to the second namespace when the second QIF is executed comprises:

causing the qubit registry to provide the first quantum process with access to the first subset of qubits and no access to the second subset of qubits; and causing the qubit registry to provide the second quantum process with access to the second subset of qubits and no access to the first subset of qubits.

16. The method of claim 13, further comprising:

starting an execution of the second QIF, wherein the second QIF comprises a plurality of instructions for executing the second quantum process;

determining, based on an instruction of the plurality of instructions, that the second quantum process is accessing the qubit registry to request one or more qubits of the plurality of qubits, wherein accessing the qubit registry comprises accessing the second namespace based on the identifier for the second namespace in the second QIF; and obtaining the one or more qubits of the plurality of qubits for the second quantum process.

17. The method of claim 13, further comprising:

receiving, from the first quantum process, a request for a first list of available qubits from the qubit registry;

sending, to the first quantum process, the first list of available qubits, wherein the available qubits are associated with the first namespace;

receiving, from the second quantum process, a request for a second list of available qubits from the qubit registry; and sending, to the second quantum process, the second list of available qubits, wherein the available qubits are associated with the second namespace.

18. The method of claim 1, further comprising:

for each respective quantum process of a plurality of quantum processes:

obtaining, from a QIF corresponding to the respective quantum process, an amount of qubits required by the respective quantum process;

creating a namespace within the qubit registry for the respective quantum process, the namespace referring to a set of qubits comprising at least the amount of qubits required by the respective quantum process;

inserting an identifier for the namespace into the QIF corresponding to the respective quantum process; and causing the qubit registry to provide the respective quantum process with access to the namespace for the respective quantum process when the QIF corresponding to the respective quantum process is executed.

19. A quantum computing device, comprising:

a memory; and a processor device coupled to the memory, the processor device to:

obtain, from a first quantum instruction file (QIF) corresponding to a first quantum process, an amount of qubits required by the first quantum process;

create a first namespace within a qubit registry comprising a plurality of qubit registry entries each corresponding to a qubit of a plurality of qubits, the first namespace referring to a first subset of qubits of the plurality of qubits, the first subset of qubits comprising at least the amount of qubits required by the first quantum process;

insert an identifier for the first namespace into the first QIF; and cause the qubit registry to provide the first quantum process with access to the first namespace when the first QIF is executed.

20. A non-transitory computer-readable storage medium that includes computer-executable instructions that, when executed, cause one or more processor devices to:

obtain, from a first quantum instruction file (QIF) corresponding to a first quantum process, an amount of qubits required by the first quantum process;

create a first namespace within a qubit registry comprising a plurality of qubit registry entries each corresponding to a qubit of a plurality of qubits, the first namespace referring to a first subset of qubits of the plurality of qubits, the first subset of qubits comprising at least the amount of qubits required by the first quantum process;

insert an identifier for the first namespace into the first QIF; and cause the qubit registry to provide the first quantum process with access to the first namespace when the first QIF is executed.

* * * * *